United States Patent
Zheng et al.

(10) Patent No.: US 9,623,399 B2
(45) Date of Patent: Apr. 18, 2017

(54) METHOD OF SURFACE MODIFICATION OF ALUMINA

(71) Applicant: Sunshine Kaidi New Energy Group Co., Ltd., Wuhan (CN)

(72) Inventors: Shenke Zheng, Wuhan (CN); Dechen Song, Wuhan (CN); Xiaodong Zhan, Wuhan (CN)

(73) Assignee: SUNSHINE KAIDI NEW ENERGY GROUP CO., LTD., Wuhan (CN)

( * ) Notice: Subject to any disclaimer, the term of this patent is extended or adjusted under 35 U.S.C. 154(b) by 225 days.

(21) Appl. No.: 14/476,762

(22) Filed: Sep. 4, 2014

(65) Prior Publication Data

US 2014/0369922 A1     Dec. 18, 2014

Related U.S. Application Data

(63) Continuation-in-part of application No. PCT/CN2013/072117, filed on Mar. 4, 2013.

(30) Foreign Application Priority Data

Mar. 5, 2012 (CN) .......................... 2012 1 0055808

(51) Int. Cl.
| | |
|---|---|
| *B01D 53/86* | (2006.01) |
| *H01B 1/12* | (2006.01) |
| *B01J 21/04* | (2006.01) |
| *B01J 35/02* | (2006.01) |
| *B01J 35/10* | (2006.01) |
| *C01F 7/02* | (2006.01) |

(52) U.S. Cl.
CPC ............. *B01J 21/04* (2013.01); *B01J 35/023* (2013.01); *B01J 35/1014* (2013.01); *B01J 35/1038* (2013.01); *B01J 35/1042* (2013.01); *B01J 35/1061* (2013.01); *C01F 7/021* (2013.01); *C01P 2004/61* (2013.01); *C01P 2006/12* (2013.01); *C01P 2006/14* (2013.01); *C01P 2006/16* (2013.01); *C01P 2006/90* (2013.01)

(58) Field of Classification Search
CPC ................................. B01D 53/86; H01B 1/12
See application file for complete search history.

(56) References Cited

U.S. PATENT DOCUMENTS

| | | | | |
|---|---|---|---|---|
| 2,437,533 | A * | 3/1948 | Huffman | B01J 21/12 502/235 |
| 5,783,515 | A * | 7/1998 | Sakurai | B01D 53/8659 502/207 |
| 2012/0085978 | A1* | 4/2012 | Tashiro | C01B 13/18 252/519.2 |

* cited by examiner

Primary Examiner — Aileen B Felton
(74) Attorney, Agent, or Firm — Matthias Scholl, PC; Matthias Scholl

(57) ABSTRACT

A method of surface modification of an alumina carrier. The method includes: 1) dissolving a soluble kazoe in deionized water to yield a kazoe aqueous solution; 2) submerging an alumina carrier in the kazoe aqueous solution and drying the alumina carrier in a vacuum environment; 3) placing the dried alumina carrier in a reactor, adding silicon tetrachloride and Grignard reagent dropwise to the reactor, sealing the reactor and heating it to a constant temperature, and maintaining the constant temperature for between 3 and 18 hours, where a volume ratio of the added silicon tetrachloride and the alumina carrier is between 0.5:1 and 5:1, the constant temperature is controlled to be between 160 and 350° C.; and 4) cooling the reactor, filtering, washing, and drying the alumina carrier in the vacuum environment.

10 Claims, No Drawings

METHOD OF SURFACE MODIFICATION OF ALUMINA

CROSS-REFERENCE TO RELATED APPLICATIONS

This application is a continuation-in-part of International Patent Application No. PCT/CN2013/072117 with an international filing date of Mar. 4, 2013, designating the United States, now pending, and further claims priority benefits to Chinese Patent Application No. 201210055808.0 filed Mar. 5, 2012. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18$^{th}$ Floor, Cambridge, Mass. 02142.

BACKGROUND OF THE INVENTION

Field of the Invention

The invention is related to a method of surface modification of alumina.

Description of the Related Art

As a catalyst carrier, alumina has the following disadvantages. First, the mechanical strength of alumina, especially its abrasion resistance, is rather low. In a continuously stirred slurry bed reactor or circulating fluidized bed bioreactor, the carrier tends to break thereby shortening the service life thereof and increasing the difficulty to separate products from catalyst powders. Second, the acid resistance of alumina is poor. Under acid environment, the surface of alumina is easily dissolved thereby weakening the connection between the active metal and the carrier. Therefore, the service life of catalysts and the product quality are low. Third, the carried active metal has strong interaction with the alumina carrier. When calcining the catalyst, an aluminate compound having a spinel structure is formed, which is very difficult to decompose. Thus, it is necessary to modify the surface of alumina carrier to improve its chemical and physical properties.

Silicon nitride has good properties, such as abrasion resistance, chemical inertness, acid resistance, and thermal conductivity. However, ordinary materials made from silicon nitride have relatively small specific surface area (below 1 $m^2$/g), which is usually insufficient for carrying active metals. In addition, the synthesis temperature of silicon nitride generally exceeds 1200° C., which is far beyond the crystal transition temperature of most alumina carriers, and the resulting primary product contains complex impurities. Thus, conventional methods cannot modify the surface of an alumina carrier by use of silicon nitride.

SUMMARY OF THE INVENTION

In view of the above-described problems, it is one objective of the invention to provide a method of surface modification of an alumina carrier. The method can synthetize silicon nitride on the surface of an alumina carrier under moderate reaction conditions, thereby improving the properties of the alumina carrier.

To achieve the above objective, in accordance with one embodiment of the invention, there is provided a method of surface modification of an alumina carrier, the method comprising:

1) dissolving a soluble kazoe in deionized water to yield a kazoe aqueous solution;
2) submerging an alumina carrier in the kazoe aqueous solution and drying the alumina carrier in a vacuum environment;
3) placing the dried alumina carrier in a reactor, adding silicon tetrachloride and Grignard reagent dropwise to the reactor, sealing and heating the reactor to a constant temperature, and maintaining the constant temperature for between 3 and 18 hours, wherein a volume ratio of the added silicon tetrachloride and the alumina carrier is between 0.5:1 and 5:1, the constant temperature is controlled to be between 160 and 350° C.; and
4) cooling the reactor, filtering, washing, and drying the alumina carrier in the vacuum environment, whereby obtaining a surface modified alumina carrier.

In a class of this embodiment, the soluble kazoe is sodium azide, potassium azide, ammonium azide, calcium azide, barium azide, or a mixture thereof.

In a class of this embodiment, a weight percentage concentration of the soluble kazoe in step 1) is between 5 and 30%, so that the surface of the alumina carrier is fully covered with sufficient kazoe and meanwhile the crystallization of the kazoe is avoided.

In a class of this embodiment, the alumina carrier is α, γ, δ, κ, or θ crystal form alumina, or a mixture thereof.

In a class of this embodiment, a temperature for drying the alumina carrier in the vacuum environment is between 20 and 80° C., and a drying time is between 2 and 4 hrs. Under the above-described environment, the moisture on the alumina carrier is effectively removed, which is good for the synthesis reaction in next step.

In a class of this embodiment, the constant temperature is controlled to be between 180 and 250° C. The temperature can ensure the reaction to proceed smoothly and avoid the decomposition of kazoe.

In a class of this embodiment, the volume ratio of the silicon tetrachloride and the alumina powder added in step 3) is controlled to be between 1:1 and 2:1, so that the alumina carrier can be completely submerged in the silicon tetrachloride.

In a class of this embodiment, the volume of the Grignard reagent added in step 3) is 0.1 to 2% of the volume of the silicon tetrachloride an addition volume of the Grignard reagent in step 3) is between 0.1 and 2% of the volume of silicon tetrachloride. The Grignard reagent here effects as a catalyst for accelerating the reaction rate between the silicon tetrachloride and kazoe.

In a class of this embodiment, in step 4), the alumina carrier is successively washed with absolute ethyl alcohol and deionized water, so as to remove organic impurities and side products of chlorides attached on the surface of the alumina carrier.

In a class of this embodiment, in step 4), a temperature for drying the alumina carrier in the vacuum environment is controlled to be between 20 and 80° C., and a drying time is controlled to be between 2 and 4 hrs.

Advantages according to embodiments of the invention are summarized below: the invention utilizes a solvothermal method to compound kazoe, silicon tetrachloride and alumina in a relatively low temperature to form a compact silicon nitride layer, which realizes the perfect combination of porous structure of alumina and high mechanical strength and chemical inertness of silicon nitride, thereby greatly improving the mechanical strength (especially abrasion resistance) and acid resistance thereof, and effectively inhibiting the interactions between the active metal and the carrier. Silicon nitride is a kind of ultra-hard matter with high abrasion resistance, and is usually used for preparation of mechanical components such as bearings and leaf of turbine. Therefore, the modified carrier has high abrasion resistance as well. Silicon nitride has good chemical inertness, which enables the modified carrier to efficiently inhibit the interactions between carried metal and the carrier. Furthermore, silicon nitride has high acid resistance. It does not react with any inorganic acid other than hydrofluoric acid. Therefore, the modified carrier has high acid resistance as well.

The alumina carrier modified by the invention is suitable for use in producing metallic catalyst and is capable of efficiently improving the properties and service life of catalyst. In addition, this method solves the problems of high energy consumption and impurity residues existing in current silicon nitride synthesis technology. Moreover, this method is simple, easy to control, and has low requirements on equipment and low energy consumption. Therefore, the method is suitable for mass production.

DETAILED DESCRIPTION OF THE EMBODIMENTS

Various embodiments of this invention are described in detail as follows in reference to optimal practical examples.

EXAMPLE 1

1. Dissolving 200 g of ammonium azide into deionized water to prepare an aqueous solution having 18 wt. % of ammonium azide;
2. Pouring into above-mentioned aqueous solution 200 mL γ-alumina powder whose average particle size is 85 μm, bulk density is 1.2 g/mL, specific surface area is 200 m$^2$/g after preroasting treatment, completely stirring, filtering the aqueous solution, and drying it in a vacuum drying cabinet under a temperature of 50° C. for 4 hrs;
3. Placing dried alumina carrier in a stainless steel reactor, adding 200 mL silicon tetrachloride, adding dropwise 1 mL Grignard reagent, sealing the reactor, sweeping with high purity nitrogen for 10 min, then raising temperature to 250° C. with the rate of 3° C./min, and maintaining the temperature for 10 hrs; and
4. Cooling the reactor to room temperature, opening the reactor and filtering the alumina carrier, washing the alumina carrier 2 to 3 times successively with absolute ethyl alcohol and deionized water, then drying the alumina carrier in the vacuum drying cabinet with a temperature of 50° C. for 4 hrs to obtain the modified alumina carrier.

EXAMPLE 2

The operation steps are the same as that in Example 1, except that in step 1), the weight percentage of the ammonium azide is raised to 25%.

EXAMPLE 3

The operation steps are the same as that in Example 1, except that in step 3), the temperature in the stainless steel reactor for maintaining reaction is controlled to be 200° C.

EXAMPLE 4

The operation steps are the same as that in Example 1, except that in step 3), the time for maintaining the temperature is controlled to be 4 hrs.

EXAMPLE 5

1. Dissolving 200 g calcium azide into deionized water to prepare an aqueous solution having 30 wt. % of calcium azide;
2. Pouring into the aqueous solution 300 mL cylindrical alumina carrier whose average grain size is 1.8 mm, bulk density is 0.6 g/mL, particle length is 5 to 6 mm, specific surface area is 150 m$^2$/g, and the weight percentages of γ-alumina and α-alumina are respectively 88% and 12% after preroasting treatment, completely stirring, filtering the aqueous solution, and drying it in a vacuum drying cabinet under a temperature of 80° C. for 2 hrs;
3. Placing dried alumina carrier in a stainless steel reactor, adding 500 mL silicon tetrachloride, adding dropwise 5 mL Grignard reagent, sealing the reactor, sweeping with high purity nitrogen for 10 min, then raising temperature to 350° C. with the rate of 3° C./min, and maintaining the temperature for reaction for 3 hrs; and
4. Cooling the reactor to room temperature, opening the reactor and filtering the alumina carrier, washing the alumina carrier 2 to 3 times successively with absolute ethyl alcohol and deionized water, then drying the alumina carrier in the vacuum drying cabinet with a temperature of 70° C. for 3 hrs to obtain the modified alumina carrier.

EXAMPLE 6

The operation steps are the same as that in Example 5, except that in step 2), the spherical alumina carrier having a particle size of Φ3 mm is substituted for the cylindrical alumina carrier and the alumina carrier is composed of 20% δ-alumina and 80% θ-alumina in weight percentage.

EXAMPLE 7

1. Dissolving 100 g sodium azide and 100 g potassium azide into deionized water to prepare a mixed aqueous solution, where the weight percentages of sodium azide and potassium azide are both 10%;
2. Pouring into the mixed aqueous solution 200 mL θ-alumina powder whose average particle size is 150 μm, completely stirring, filtering the aqueous solution, and drying it in a vacuum drying cabinet under a temperature of 30° C. for 3 hrs;
3. Placing the dried alumina carrier in a stainless steel reactor, adding 300 mL silicon tetrachloride, adding dropwise 2 mL Grignard reagent, sealing the reactor, sweeping with high purity nitrogen for 10 min, then raising temperature to 160° C. with the rate of 2° C./min, and maintaining the temperature for reaction for 18 hrs; and
4. Cooling the reactor to room temperature, opening the reactor and filtering the alumina carrier, washing the alumina carrier 2 to 3 times successively with absolute ethyl alcohol and deionized water, then drying the alumina carrier again in the vacuum drying cabinet with a temperature of 40° C. for 2 hrs to obtain the modified alumina carrier.

The physical and chemical properties of the alumina carrier modified in Examples 1-4 have been measured. The result is showed in the following Table 1. In Table 1, the contrast sample is non-modified γ-alumina.

TABLE 1

| Physical and chemical properties | Modified γ-alumina | | | | Non-modified γ-alumina |
|---|---|---|---|---|---|
| | Example 1 | Example 2 | Example 3 | Example 4 | |
| Total specific surface area, m²/g | 201.47 | 198.42 | 200.54 | 201.32 | 218.46 |
| Average pore size, nm | 7.68 | 8.13 | 8.35 | 8.28 | 8.95 |
| Total pore volume, mL/g | 0.42 | 0.45 | 0.44 | 0.45 | 0.49 |
| Average particle size, μm | 84.32 | 89.01 | 85.21 | 86.43 | 85.54 |
| Weight percentage of silicon nitride, wt. % | 6.1 | 8.9 | 3.5 | 1.2 | — |
| Abrasion resistance, μm | 76.34 | 86.82 | 72.17 | 65.76 | 52.04 |

Remark: the abrasion resistance in the table is tested in jet-ring experiment equivalent to ASTMD5757-00. The abrasion resistance is acquired by comparison with average pore diameters after abrasion.

TABLE 2

| Physical and chemical properties | Modified θ-alumina | Non-modified θ-alumina |
|---|---|---|
| Total specific surface area, m²/g | 177.3 | 180.5 |
| Total pore volume, mL/g | 0.88 | 0.91 |
| Weight percentage of silicon nitride, wt. % | 7.6 | — |
| Abrasion resistance, μm | 124.52 | 30.21 |

Remark: the abrasion resistance in the table is tested in jet-ring experiment equivalent to ASTMD5757-00. The abrasion resistance is acquired by comparison with average pore diameters after abrasion.

The physical and chemical properties of alumina carrier modified by steps 1) to 4) in Example 7 have been measured. The result is showed in the following Table 2. In Table 2, the contrast sample is non-modified θ-alumina.

According to the data of Table 1 and Table 2, the alumina carrier modified in the invention, presents no apparent differences in properties of porous structure (total specific surface area, total pore volume, and average pore diameter), which means that the modified alumina carrier still keeps the properties of porous structure of original carrier and is suitable for being used as a carrier of metal catalyst. In addition, according to the test of abrasion resistance in the jet-ring experiment equivalent to ASTMD5757-00 and comparing the average pore diameters after abrasion, the data shows the average particle diameter of modified carrier is apparently bigger than that of non-modified carrier. It means that the abrasion resistance of carrier is apparently improved and the abrasion resistance is improved following the raising of mass percentage of silicon nitride.

In addition, the data in Table 1 and Table 2 shows that, raising the concentration of kazoe solution is able to increase the amount of kazoe deposited on the surface of carrier. Raising the temperature or prolonging the reaction time between silicon tetrachloride and alumina is able to increase the completeness of reaction. All of these factors are able to effectively raise the weight percentage of silicon nitride, which corresponds to raising the thickness of the silicon nitride layer on the surface of alumina.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method of surface modification of alumina, the method comprising:
    1) dissolving a soluble kazoe in deionized water to yield a kazoe aqueous solution;
    2) submerging an alumina carrier in the kazoe aqueous solution and drying the alumina carrier in a vacuum environment;
    3) placing the dried alumina carrier in a reactor, adding silicon tetrachloride and Grignard reagent dropwise to the reactor, sealing and heating the reactor to a constant temperature, and maintaining the constant temperature for between 3 and 18 hours, wherein a volume ratio of the added silicon tetrachloride and the alumina carrier is between 0.5:1 and 5:1, the constant temperature is controlled to be between 160 and 350° C.; and
    4) cooling the reactor, filtering, washing, and drying the alumina carrier in the vacuum environment, whereby obtaining a surface modified alumina carrier.

2. The method of claim 1, wherein the soluble kazoe is sodium azide, potassium azide, ammonium azide, calcium azide, barium azide, or a mixture thereof.

3. The method of claim 2, wherein a weight percentage concentration of the soluble kazoe in step 1) is between 5 and 30%.

4. The method of claim 2, wherein the alumina carrier is α, γ, δ, κ, or θ crystal form alumina, or a mixture thereof.

5. The method of claim 2, wherein a temperature for drying the alumina carrier in the vacuum environment is between 20 and 80° C., and a drying time is between 2 and 4 hrs.

6. The method of claim 2, wherein the constant temperature is controlled to be between 180 and 250° C.

7. The method of claim 2, wherein the volume ratio of the silicon tetrachloride and the alumina powder added in step 3) is controlled to be between 1:1 and 2:1.

8. The method of claim 2, wherein an addition volume of the Grignard reagent in step 3) is between 0.1 and 2% of the volume of silicon tetrachloride.

9. The method of claim 2, wherein in step 4), the alumina carrier is successively washed with absolute ethyl alcohol and deionized water.

10. The method of claim 2, wherein in step 4), a temperature for drying the alumina carrier in the vacuum environment is controlled to be between 20 and 80° C., and a drying time is controlled to be between 2 and 4 hrs.

* * * * *